United States Patent
Pasquarette et al.

(10) Patent No.: US 7,573,514 B2
(45) Date of Patent: Aug. 11, 2009

(54) DIGITAL IMAGING SYSTEM WITH DIGITAL ZOOM WARNING

(75) Inventors: Stephen J. Pasquarette, Honeoye Falls, NY (US); Arlene T. Jourdan, Rochester, NY (US); Barbara A. Ledyard, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 651 days.

(21) Appl. No.: 11/050,531

(22) Filed: Feb. 3, 2005

(65) Prior Publication Data

US 2006/0170793 A1    Aug. 3, 2006

(51) Int. Cl.
*H04N 5/262* (2006.01)
*H04N 5/222* (2006.01)

(52) U.S. Cl. ............... 348/240.2; 348/240.99; 348/240.1; 348/333.02; 348/333.04

(58) Field of Classification Search ............ 348/208.15, 348/240.99, 240.1, 240.2, 333.01, 333.03, 348/333.04; 396/88, 287, 290, 296, 379
See application file for complete search history.

(56) References Cited

U.S. PATENT DOCUMENTS

| | | | | |
|---|---|---|---|---|
| 5,831,670 | A * | 11/1998 | Suzuki | 348/208.15 |
| 6,018,397 | A * | 1/2000 | Cloutier et al. | 358/1.1 |
| 6,289,178 | B1 * | 9/2001 | Kazami | 396/60 |
| 6,539,177 | B2 | 3/2003 | Parulski | |
| 6,603,506 | B2 * | 8/2003 | Ogawa et al. | 348/207.2 |
| 6,643,416 | B1 | 11/2003 | Daniels et al. | |
| 7,286,160 | B2 * | 10/2007 | Ejima et al. | 348/207.2 |
| 7,319,811 | B2 * | 1/2008 | Tojo et al. | 386/96 |
| 2003/0103156 | A1 * | 6/2003 | Brake et al. | 348/333.01 |
| 2003/0117511 | A1 | 6/2003 | Belz et al. | |
| 2004/0174444 | A1 | 9/2004 | Ishii | |
| 2004/0258292 | A1 * | 12/2004 | Matsuno | 382/132 |

OTHER PUBLICATIONS

Eastman Kodak Company, Kodak EasyShare DX6490 zoom digital camera (user's guide), 2003, www.kodak.com.
Fuji Photo Film Co., Ltd., "Digital Camera FinePix S5000", Jul. 1, 2003, pp. 1-110, XP-002383324.

* cited by examiner

*Primary Examiner*—David L Ometz
*Assistant Examiner*—Peter Chon
(74) *Attorney, Agent, or Firm*—Roland R. Schindler (57) ABSTRACT

Digital imaging system and method in which user operation of a digital zoom selection switch to increase digital zoom of a portion of an evaluation image is interrupted for at least an interval of time as a warning to the user that the digital zoom selection has reached a digital zoom ratio that corresponds to a predetermined minimum image resolution quality level in an image of a given size to be rendered from the portion of the evaluation image. The user can then resume increasing digital zoom selection only by opening and re-closing the zoom selection switch. A graphical indicator is used to show changes in zoom settings and the appearance of the indicator is changed when one or more predetermined digital zoom settings are reached to reinforce the visual warning to the user.

17 Claims, 8 Drawing Sheets

DIGITAL IMAGING SYSTEM WITH DIGITAL ZOOM WARNING

CROSS-REFERENCE TO RELATED APPLICATIONS

Reference is made to commonly assigned, co-pending patent application U.S. Ser. No. 10/601,233, entitled IMAGING METHOD AND SYSTEM, filed Jun. 20, 2003 in the names of Herbert et al.

FIELD OF THE INVENTION

The present invention relates to digital imaging systems, such as digital cameras and methods for operating the same, more particularly, to digital imaging systems having a digital zoom feature.

BACKGROUND OF THE INVENTION

Digital imaging is an increasingly popular form of scene capture and image or photographic print rendering. One reason for this popularity is the ease with which users can manipulate, edit, alter and enhance such digital images. For example, users often use manual digital imaging and editing tools that allow a user to select a limited portion of the captured image that is to be enlarged, using digital interpolation techniques, to the same size in the rendered image, photographic print, or electronic display as would have been rendered if the entire captured image had used. This process is commonly referred to as "digital zoom". Since the interpolation techniques of the digital zoom process effectively spread a lesser amount of data over the same rendered image size as would have been produced from the entire captured image, the image resulting form the digital zoom process has a reduced image resolution as compared to the same sized image produced data taken from the entire captured image.

Often, the digital zoom functions is performed using image processing systems such as cameras, personal computers, kiosks, personal digital assistants, network centric systems, other devices. These devices generally have a display for presenting a digital image and some form of user interface to permit a user to designate a selection area, commonly the central area of the image, for use in forming a zoom and crop processed image. In some digital cameras, a graphical indicator may be provided to advise the camera user that digital zoom selection is in operation. However, such arrangements do not always advise the user of whether a particular selected digital zoom setting will result in a satisfactory resolution in the rendered image. Digital zoom setting is usually expressed as a digital zoom ratio where a zoom ratio of 1.0× corresponds to minimum or no zoom and higher ratios correspond to higher amounts of zoom enlargement. In U.S. Patent Application Publication 2003/0117511, an attempt to warn a camera user of the effect of the zoom ratio selection on appearance quality of the to-be rendered image or print is provided in the form of text or graphical indicators (icons) that suggest that lowered image resolution (or print satisfaction) may result with increasing zoom ratio selection. However, such warnings have the disadvantage that they are passive, in nature, and can be easily overlooked and ignored during the image composition process.

In more sophisticated systems, the digital image data contained the selection area may be processed during image composition using the digital zoom setting to form a processed evaluation image ostensibly as it would appear in the ultimate rendered image. In this case, users often rely upon the appearance of the evaluation image as presented in the display in order to determine whether the zoom and crop processed image represented by the evaluation image has a preferred appearance. Where the evaluation image has an acceptable appearance, users will often elect to store the zoom and cropped processed image, or use a printer or like device to render the zoom and cropped processed image on a film fabric or paper. However, the limited display resolution of conventional electronic displays and, in particular, small sized displays of the type commonly used in conjunction with digital cameras can mask the loss of resolution in a zoom and crop processed image. Accordingly, users can designate a selection area that comprises only a fraction of the original image without realizing that such aggressive use of the zoom and crop algorithm can reach a point where so much of the data comprising the originally captured digital image has been discarded that the zoom and crop processed image does not have a minimum amount of data necessary for the rendered image of given size to have an acceptable level of image quality (resolution).

Commonly assigned U.S. Pat. No. 6,018,397, entitled "Digital Image Processing With Indication to User of Hardcopy Output Image Quality", issued Jan. 25, 2000 by Cloutier et al. describes a digital image processor that establishes a boundary level of acceptable hardcopy print quality level based on selected image print size and printing magnification and provides a warning to a user prior to generation of the hardcopy print that alerts the user when the determine print image quality will be unsatisfactory. This system receives inputs including digital image data representative of an image to be reproduced in hardcopy at a user-selected size, hardcopy image quality information being representative of acceptable and unacceptable levels of hardcopy image quality produced with said hardcopy image reproduction and information representative of the desired magnification and user selected size of the hardcopy image to be output and indicates whether this combination will generate images having an acceptable appearance. The '397 patent provides a warning to a user when the user selects a combination that may not yield acceptable results prior to submitting the image for hard copy image formation. While useful and commercially valuable, this approach requires a user to designate a selection area within the image and indicate a desired output before providing the warning.

SUMMARY OF THE INVENTION

The present invention has utility in a variety of digital imaging systems. This may comprise a camera, either of the type having solely digital image capture and archival storage or of the hybrid type having a film capture unit combined with a digital image capture unit for image evaluation during image composition, i.e. for aiming, focus, zoom selection and the like with the film capture unit used for archival image storage coupled with digital data storage on the film for use in conveying the photographer's to the film processing laboratory. It is also useful in a digital image reproducing system for accepting and displaying digital image data on as evaluation image that allows the user of the system to modify the image for, inter alia, zoom selection, prior to processing of the modified image into a high resolution hard copy print.

In accordance with the invention in its broadest aspects, the digital imaging system of the invention comprises a digital imaging unit for generating a full sized digital image of a scene and an evaluation image generation unit. The system further includes a digital zoom generating unit, including a user operated digital zoom selector that determines a lesser portion of the full sized digital image to be rendered by interpolation into a final reproduced image that corresponds in size to images generated from the full sized image, and a graphical zoom indicator unit that generates a graphical indication in association with the evaluation image of increases and decreases of digital zoom ratios in response to user operation of the digital zoom selector. The system further includes a controller that effects increasing and decreasing digital zoom ratios in response to user operation of the digital zoom selector and that interrupts indication of increasing digital zoom ratios for at least a first interval of time when the selected zoom ratio reaches one or more particular digital zoom ratio settings that corresponds to predetermined image quality levels for a given size of rendered image, the interruption serving as a warning to the user that the particular digital zoom ratio has been reached so as to allow the user the opportunity to discontinue further increase of the select digital zoom ratio. A first digital zoom ratio setting is preferably related to a minimum acceptable image quality level for resolution in the rendered image. A further setting can be one that corresponds to an image quality level beyond which the image resolution quality of the rendered image would be considered unacceptable.

In a further aspect of the invention, the graphical indicator includes a movable indicator to indicate increases and decreases of selected zoom ratios and that is stopped by the controller when one of the particular first digital zoom ratio settings so as to give a further warning to the system user. In yet another aspect of the invention, the controller is operative to change the appearance of the graphical indicator, for example, by changing the color of a portion of the indicator to further reinforce the warning to the user.

Another aspect of the invention comprises: an optical system focusing light from a scene onto a digital imager sensor; a digital driver adapted to cooperate with the digital imager sensor to convert the focused light that falls onto a sensing are of the digital image sensor into an image signal having image information therein; a signal processor adapted to convert the image signal into a digital image; an information display for converting a display signal into a visible output; a zoom control adapted to sense a user input action requesting in increase in a digital zoom ratio and to generate an zoom increase signal; and a controller that senses the zoom increase signal and causes the signal processor to form a digital image using less than all of the image information from the image signal, wherein the extent of the image information used in forming the digital image is reduced to the selected digital zoom ratio; the controller being adapted to decrease the extent of the image information used in forming a digital image for presentation on the display in response to the sensed zoom increase signal except where the controller determines that a currently set digital zoom ratio setting corresponds to a minimum image resolution required for a particular use of the image and where this occurs, the controller does not respond to the detected zoom increase signal.

Another aspect of the invention comprises: a digital imaging means for generating a full sized digital image of a scene; an evaluation image generating means for generating an evaluation image for presentation on a display means; a digital zoom generating means, including a user operated digital zoom selecting means, a digital zoom generating means for determining a lesser portion of the full sized digital image to be rendered by interpolation into a final reproduced image that corresponds in size to images generated from the full sized image; a graphical zoom indicator means for generating a graphical indication in association with the presented evaluation image of increases and decreases of digital zoom ratios in response to user operation of the digital zoom selector; and a control means for effecting increasing and decreasing digital zoom ratios in response to user operation of the digital zoom selector means and that interrupts indication of increasing digital zoom ratios for at least a first interval of time when the selected zoom ratio reaches a first digital zoom ratio setting that corresponds to a minimum acceptable image quality level for a given size of rendered image, the interruption serving as a warning to the user that a minimum acceptable print image quality has been reached so as to allow the user the opportunity to discontinue further increase of the select digital zoom ratio.

Another aspect of the invention comprises: a digital imaging means for generating a full sized digital image of a scene; an evaluation image generation means for generating an evaluation image; a digital zoom generating means, including a user operated digital zoom selecting means, a digital zoom generating means for determining a lesser portion of the full sized digital image to be rendered by interpolation into a final reproduced image that corresponds in size to images generated from the full sized image; a graphical zoom indicator means for generating a graphical indication in association with the evaluation image of increases and decreases of digital zoom ratios in response to user operation of the digital zoom selector; and a control means that effects increasing and decreasing digital zoom ratios in response to user operation of the digital zoom selector means and that interrupts indication of increasing digital zoom ratios for at least a first interval of time when the selected zoom ratio reaches a first digital zoom ratio setting that corresponds to a minimum acceptable image quality level for a given size of rendered image, the interruption serving as a warning to the user that said minimum acceptable print image quality has been reached so as to allow the user the opportunity to discontinue further increase of the select digital zoom ratio.

In another aspect of the invention, a method for operating a digital imaging system comprises the steps of: generating a full sized digital image of a scene; determining a lesser portion of the full sized digital image to be rendered by interpolation into a final reproduced image that corresponds in size to images generated from the full sized image based upon a user setting of a digital zoom ratio; generating an evaluation image of the lesser portion of the image; generating a graphical indication in association with the evaluation image that indicates the user digital zoom setting; and effecting increasing and decreasing digital zoom ratios in response to user changes in the user digital zoom ratio and interrupts indication of increasing digital zoom ratios for at least a first interval of time when the digital zoom ratio reaches a first digital zoom ratio setting that corresponds to a minimum acceptable image quality level for a given size of rendered image, the interruption serving as a warning to the user that said minimum acceptable print image quality has been reached so as to allow the user the opportunity to discontinue further increase of the select digital zoom ratio.

In yet another aspect of the invention, a method for operating a digital camera comprises: generating a full sized digital image of a scene; generating an evaluation image of the lesser portion of the image; generating a graphical indication in association with the evaluation image that indicates the user digital zoom ratio used in forming the evaluation image; and effecting an increasing in digital zoom ratios in response a detected user action indicating a request for a greater digital zoom ratio and that interrupts increasing digital zoom ratios for at least a first interval of time when the selected zoom ratio reaches a first digital zoom ratio setting that corresponds to a minimum acceptable image quality level for a given size of rendered image, the interruption serving as a warning to the user that said minimum acceptable print image quality has been reached so as to allow the user the opportunity to discontinue further increase of the select digital zoom ratio.

DETAILED DESCRIPTION OF THE INVENTION

Figure 1:
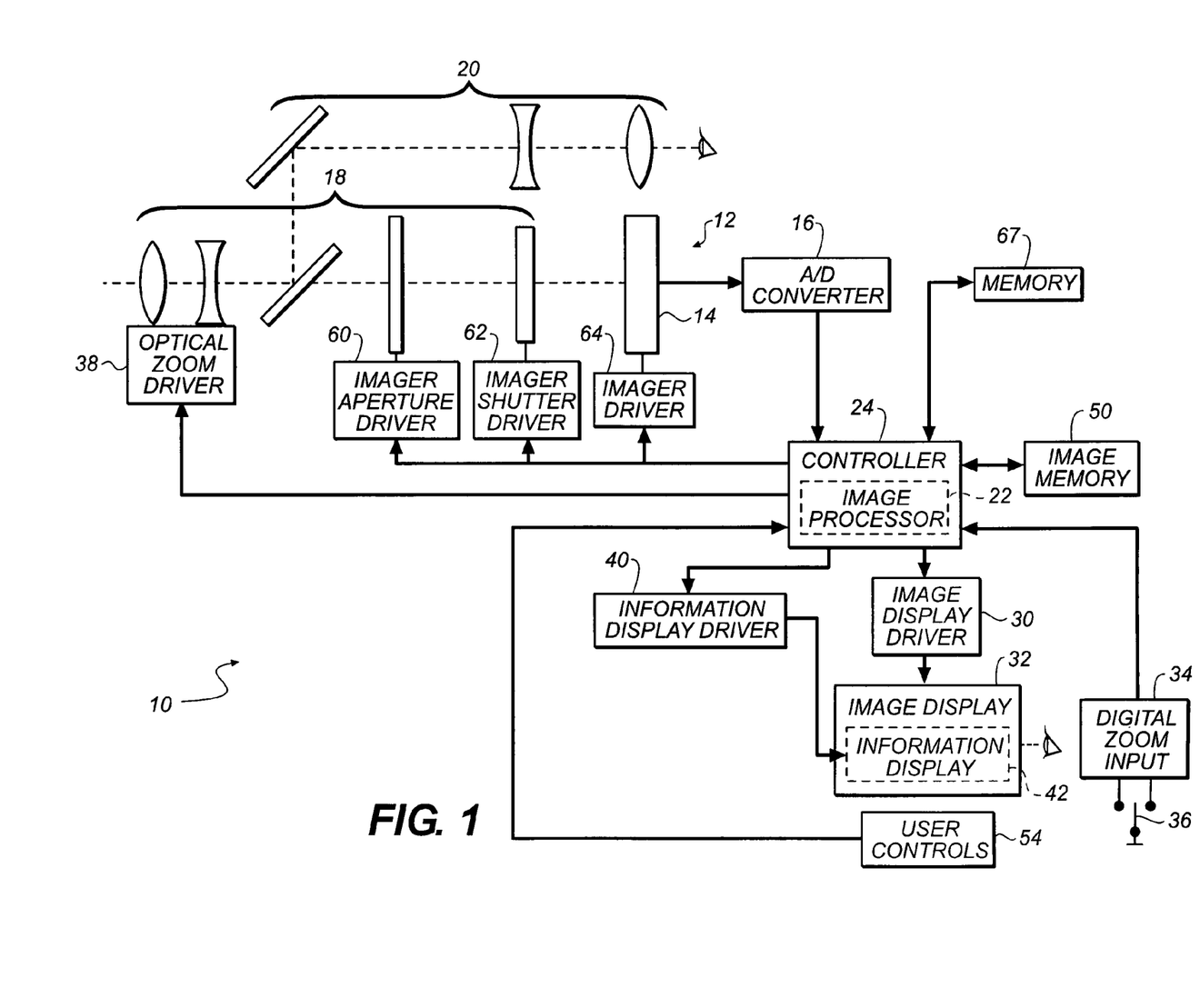
FIG. 1 is a schematic diagram of a digital zoom camera embodying the present invention.

In FIG. 1, the basic components of a digital imaging camera 10 illustrative of one embodiment of the invention is shown. In camera 10, a digital imaging unit 12 includes a solid state digital image sensor 14 for generating a full sized digital image of a scene. Digital imaging unit 12 includes an optical system 18 which directs light to the imager sensor. Optical system 18 may also direct light through an optional optical viewfinder 20 to the user. An A/D converter 16 converts analog pixel values from image sensor 14 into digital values which are sent to an image processor 22 included in a camera controller 24. Controller 24 and image processor 22 serve a plurality of functions, the germane functions for the purposes of the present invention being that of generating an evaluation or preview image, generating a digital zoom control and generating a graphical zoom indicator. Additionally, controller 24 operates through imager aperture driver 60 to control light exposure level onto the sensor, through imager shutter driver 62 to expose the scene onto the sensor and through imager driver 64 to control the operation of the image sensor, all in known manner.

An evaluation image generation unit of camera 10 includes image processor 22 in controller 24, an image display driver 30 and an image display 32 which may comprise an LCD or organic light emitting diode display device mounted in well known manner on the rear cover of camera 10. This display is typically used by the camera user in aiming the camera.

Camera 10 is also provided with a digital zoom generating unit, including a user operated digital zoom selector comprised of digital zoom input 34 and selector switch 36, that determines a lesser portion of the full sized digital image captured by digital imaging unit 12 that is to be rendered by interpolation into a final reproduced image that corresponds, in size, to images generated from the full sized digital image. In addition to digital zoom operation, camera 10 may also include an optical zoom driver 38 providing for optical zoom of the image on image sensor 14. In known manner, optical zoom is typically actuated before invoking digital zoom and, therefore, it will be understood that, although zoom input 34 and selector switch 36 are variously referred to herein as digital zoom controls, they are also used for optical zoom control if the camera is so equipped.

A graphical zoom indicator unit includes information display driver 40 and an information display 42 that generates a graphical indication in association with the evaluation image of increases and decreases of digital zoom ratios in response to user operation of the digital zoom selector. Information display 42 may comprise a separate LCD display panel on the camera rear cover adjacent to the evaluation display panel, or it may comprise graphical display incorporated into the evaluation display image itself as will be shown later.

Camera controller 24 and image processor 22 effects increasing and decreasing digital zoom ratios in response to user operation of the selector switch 36 and in accordance with a primary aspect of the invention, interrupts indication of increasing digital zoom ratios in the graphical zoom indicator for at least a first interval of time when the selected zoom ratio reaches a first digital zoom ratio setting that corresponds to a minimum acceptable image quality level for a given size of rendered image. This interruption serves as an affirmative warning to the user that a minimum acceptable print image quality in terms of rendered image resolution has been reached thereby allowing the user the opportunity to discontinue further increase of the select digital zoom ratio.

Once an image satisfactory to the user has been composed, with or without digital zoom effects, the image is then stored as an archival image in image memory 50 which may comprise a built-in memory unit. Optionally, the image can be shared with a remote device by using a wired connection, download the image data to the remote device, a wireless connection via communication circuit 26, such as a radio frequency, data communication circuit, or communication circuit 26 that transmits optical signals or a removable memory 67.

Figure 2A:
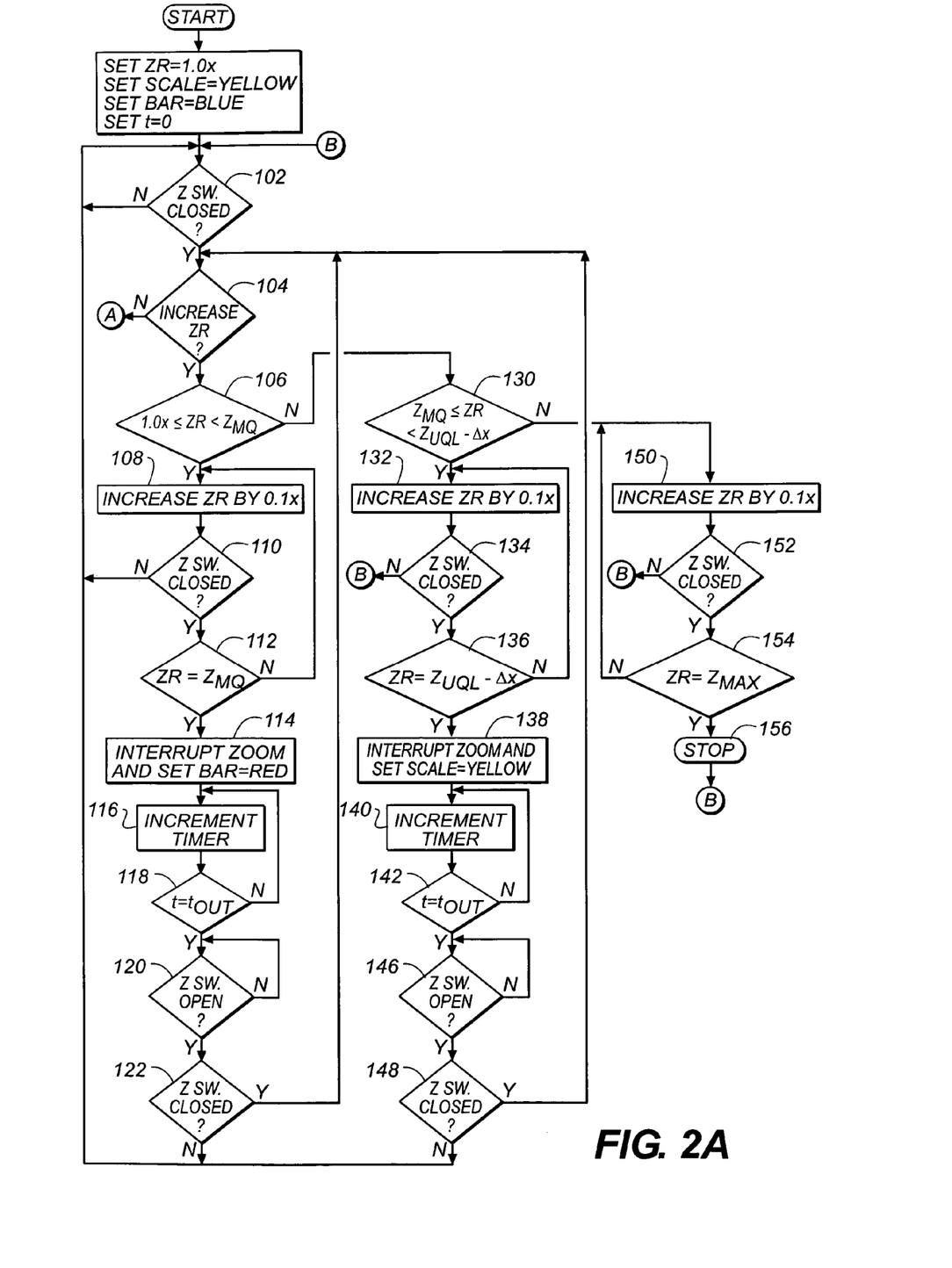
FIGS. 2A-2B, combined, is a process flow chart for a controller program which is useful in the operation of the invention.
Figure 2B:
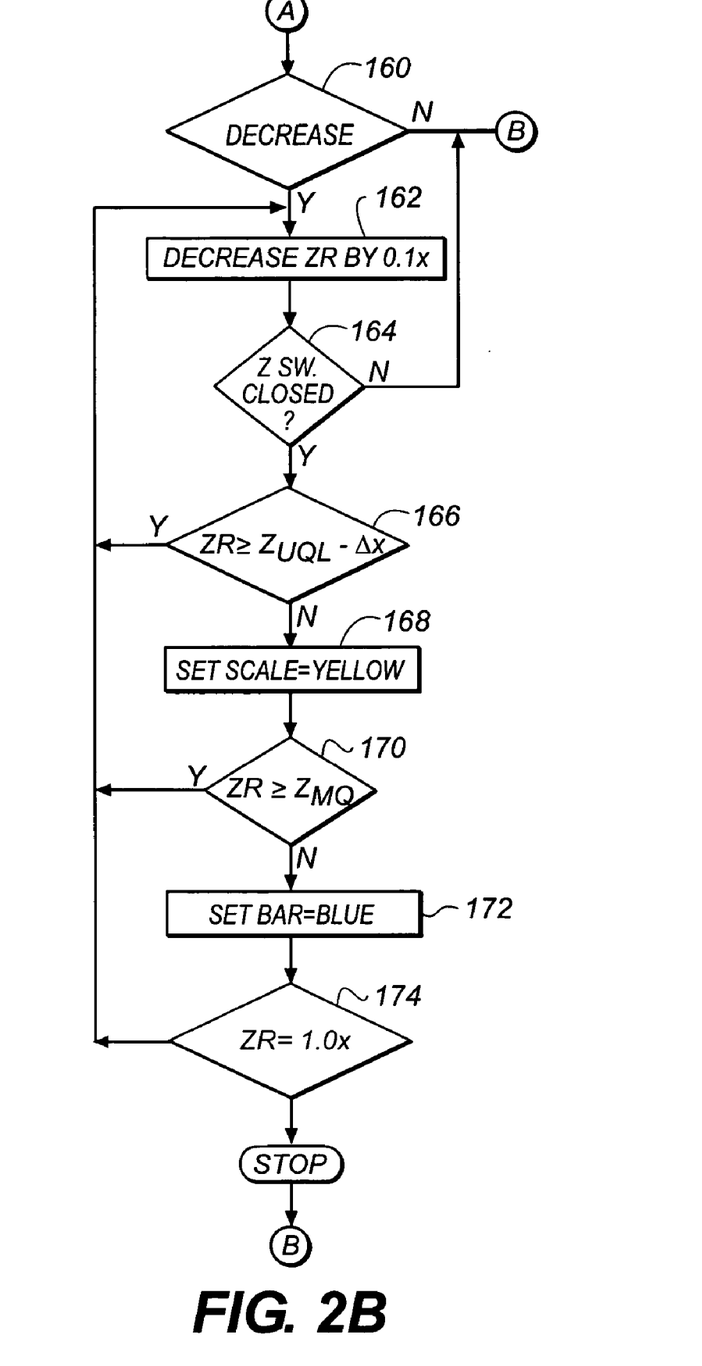
Figure 3A:
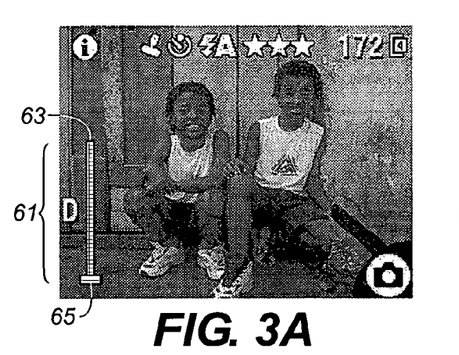
FIGS. 3A-3D is a series of evaluation images illustrating the operation of the graphical indicator of the invention at various stages of digital zoom selection.
Figure 3B:
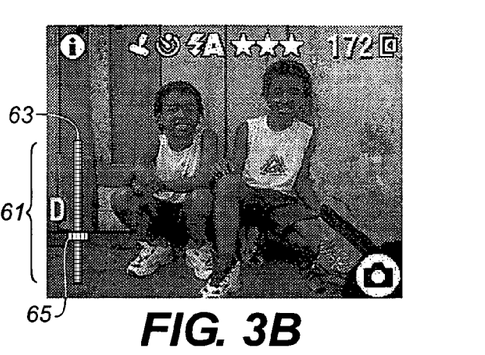

The operation and advantages of the invention can more clearly be understood with reference to the process flow chart of FIGS. 2A-2B and the series of evaluation images illustrated in FIGS. 3A-3B. Typically camera 10 is set to begin the image capture process with the zoom selector switch 36, which can be spring loaded and biased thereby into a neutral position and with substantially the full image from image sensor 14 displayed on the image display 32, i.e. a digital zoom ratio of 1.0×. If the camera user decides to zoom in to a portion of the displayed image, the user moves selector switch 36 to the "increase" terminal to initiate the digital zoom process at the START step in FIG. 2A. It will be appreciated that throughout the zoom selection process, controller 24 optionally can mask out the undesired portion of an image formed on image sensor 14 and interpolate the remaining selected portion up to the full size of image display 32, although, for convenience in illustration of the invention, this is not shown in FIGS. 3A-3D. When the digital zoom process is entered at the START step, the zoom ratio (ZR) is set to 1.0× and a digital zoom indicator 61 is displayed as shown in FIG. 3A with a fixed vertical scale 63 that displays the full range of zoom ratio from $ZR=1.0\times$ to $ZR=Z_{MAX}$ and with a movable bar 65 that indicates the degree of selected increased digital zoom by its vertical position along the bar. Preferably, the letter D is also displayed as advice to the user that digital zoom operation has been initiated. At the outset the scale is set to a first scale color, such as yellow, and the movable bar is set to a first bar color, such as blue. A timer, to be discussed further below, is set to a count of "0".

The open/closed condition of selector switch 36 is monitored by query 102 and, when closed, query 104 determines if selector switch 36 is set for a increase or decrease. If zoom is set to increase, query 106 determines if the currently selected zoom ratio is below a first intermediate digital zoom ratio, $Z_{MQ}$. This level, $Z_{MQ}$, is the minimum image resolution quality level corresponding to the digital zoom ratio that can be applied to the selected portion of the full scene image that empirical tests have shown will produce a pleasing level of image resolution in a final rendered image of a given size. For example, a description of minimally acceptable scan resolutions at different zoom crop amounts for different image perception acceptability amounts and corresponding quality levels may be found in commonly assigned U.S. Pat. No. 6,643,416. If the digital zoom is increased beyond the $Z_{MQ}$ zoom ratio setting that corresponds to this size, the image degradation in loss of resolution becomes noticeable and makes the resultant image unpleasant for viewing. Consequently, the digital zoom ratio can be preset in the camera program for a standard print (rendered image) size of 4×6 inches, or some other suitable size, or, alternatively, the camera user can enter another desired print size using externally accessible user controls 54.

As long as the current digital zoom ratio setting is below the $Z_{MQ}$ setting and the user holds the selector in the closed (increase) position, as sensed by query 110, instruction 108 will increment the zoom ratio setting upward and the movable bar 65 will rise along the scale 63. This will continue until query 112 determines that the zoom ratio setting has reached the level $Z_{MQ}$ whereupon, in accordance with a feature of the invention, instruction 114 will interrupt the increase in zoom ratio selection, even though the user continues to hold selector switch 36 in the "increase" position. A timer is started by instruction 108 and is continually incremented until a preset timeout, for example two seconds is reached as will be detected by query 118. The exact timeout period is a matter of choice but it should be sufficiently long to cause the user to realize that zoom has stopped thereby warning the user that the highest level of zoom, or, in other words the minimum image quality level for the set print size, has been reached.

In accordance with a further feature of the invention, instruction 114 also preferably changes the color of the movable bar from blue to red, as seen in FIG. 3B, thereby reinforcing the visual warning to the user. Typically, this warning would cause the user to release and open the switch, as detected by query 120 either to take the picture or, optionally to initiate a reduction in the digital zoom ratio. Should the user wish to continue increasing the zoom ratio setting despite the potential for a degraded rendered image, selector switch 36 must be allowed to return to the neutral position and re-closed to the "increase" position, as detected by query 122, in order to proceed. Thus, in accordance with yet another feature of the invention, the user not only is given visual warnings to reaching the minimum image quality level of resolution, but is optionally also required, in the illustrated embodiment, to perform the physical act of opening and re-closing the digital zoom selector switch in order to overcome the built-in image quality safety feature of the camera, thereby avoiding the user's inadvertent increasing of digital zoom selection into non-pleasing image resolution quality levels.

Figure 3C:
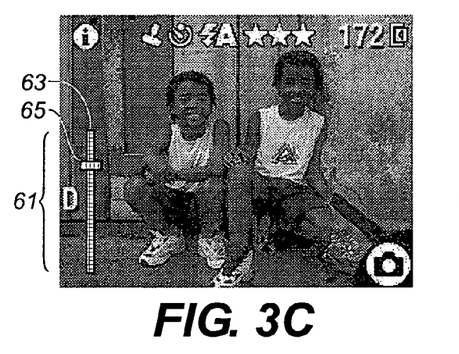
Figure 3D:
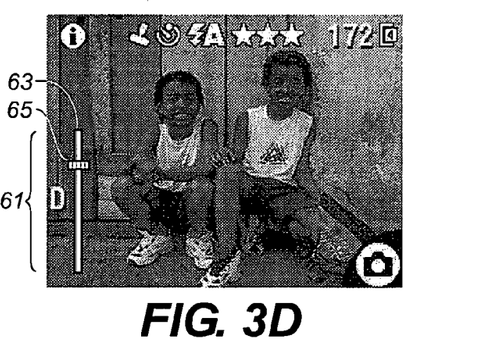

Assuming that the user wishes to continue increasing the zoom ratio settings as determined by query 122 sensing the re-closure of switch 26, the process returns to query 102 to determine whether the switch is set for "increase" or "decrease". Since selector switch 36 is closed at this juncture, the process proceeds through query 102 to query 130 which determines if the current zoom selection ratio setting is in the range of from $Z_{MQ}$ to a level of some increment Δx just below an empirically determined level $Z_{UQL}$ at which the image resolution quality level is generally considered to be completely unacceptable. Thus, in this range, i.e. $Z_{MQ} \leq ZR < Z_{UQL}$, the assumption is that, even though the rendered image resolution will be very noticeably degraded, the user may wish to accept the lesser resolution in favor of getting the selected digitally zoomed image. At this point in the example, the digital zoom setting is currently at the minimum image quality level $Z_{MQ}$ and therefore the process moves through instruction 132 to increment the zoom setting, raising the now red bar 65 up the scale 63, and through queries 134 and 135 to continue raising the zoom ratio settings until the level $ZR = Z_{UQL} - \Delta x$ is reached as shown in FIG. 3C. At this point the digital zoom function is again interrupted by instruction 138 for a time interval determined by timer increment instruction 140 and query 142 thereby visually warning the user that a second level has been reached beyond which the rendered image resolution will be unacceptable. In addition, instruction 138 reinforces the visual warning by changing the color of the scale 63 to red in FIG. 3D. As is the case with the lower range of digital zoom ratio settings, queries 146 and 148 allow the user to continue digital zoom increase beyond the $Z_{UQL} - \Delta x$ level by opening and re-closing the selector switch to the "increase" digital zoom position. After passing through steps 102, 104, 106, and 130, the steps 152, 154 and 156 incrementally increase the digital zoom to a maximum digital zoom setting of $Z_{MAX}$ at which point the process stops pending further action by the user by way of initiating image capture or by re-closing the selector switch 36 to "decrease" as sensed by queries 102 and 104 to lower the digital zoom settings.

At any time that the user closes selector switch 36 to "decrease" mode the digital zoom setting decreases as long as the selector switch remains closed without interruption as it passes through the intermediate levels of $Z_{UQL} - \Delta x$ and $Z_{MQ}$. To this end, in the "decrease" mode, query 104 causes the process to branch to the zoom decrease flow chart shown in FIG. 2B. In this process, when query 160 senses the "decrease" setting, the process moves to instruction 162 which initiates incremental decrease of the digital zoom setting. As long as the selector switch remains closed, the decrease in zoom setting continues until query 166 determines that the zoom setting has reached the $Z_{UQL} - \Delta x$ setting at which time instruction 168 changes the scale color back to yellow. With the switch still closed, the decrease in zoom setting continues uninterrupted. When query 170 determines that the setting has reached the $Z_{MQ}$ setting, instruction 172 resets the movable bar color back to the color blue and, without any interruption, the decrease in zoom setting continues until it reaches the minimum level of 1.0×, at which time the process stops.

Figure 3E:
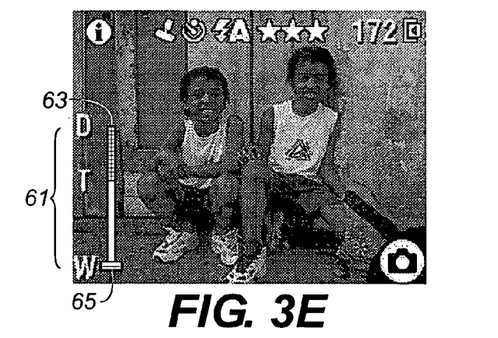
FIG. 3E is an evaluation image for another embodiment of the invention.

If camera 10 is equipped to perform optical zoom, the graphical indicator may show a dual range scale, as seen in FIG. 3E, with the letters "W" and "T" indicating the optical zoom range in conventional manner where "W" stands for wide angle and "T" stands for telephoto. In this embodiment, the program flow chart of FIG. 2A can optionally include an initial test such as described above for reaching the maximum end "T" of the optical zoom scale with interruption requiring opening and closing of the selector switch before entering the digital zoom range. It is known for example, from a Kodak digital still camera, the DX 6490 and from a Fischer digital movie camera Model FVD-C1 to provide a pause between optical and digital zoom. This is merely a pause between two different types of zoom function (optical and digital) but does not provide a warning or indicator of image quality within the digital zoom function.

FIGS. 4-7 show way in which information display 42 can present information that a user 6 can use to determine the impact that the use of digital zoom will have on the digital image that is captured at a particular digital zoom setting. In particular, in the embodiment illustrated in these figures, the digital zoom indicator 61 which indicates the extent of digital zoom is expressed graphically in terms of the impact that such digital zoom will have upon a set of uses that user 6 might want to make of the image captured at the particular digital zoom setting.

In the example shown in FIGS. 4-7 a view of an image display 32 is provided in which an evaluation image of a scene to be captured by camera 10 is presented prior to image capture. As is shown in FIGS. 4-7 a set of use icons 66 are also presented. In this embodiment, set of use icons 66 is shown located in an information display 42 portion of image display 32. Use icons 66 each represent a particular use to which a captured digital image can be put and the appearance of the icons is used to indicate whether the current level of digital zoom will yield a digital image that can support the use of a digital image that is represented by the icon. Typically, this determination will be made on the basis of whether a digital image that is captured at a current level of digital zoom will provide sufficient image resolution so that the captured digital image can used in the desired fashion. For example, low resolution digital images cannot often be used for optical character recognition or other image analysis purposes. Further large scale printed images or presentations of low resolution images on high definition televisions, often have an appearance that is not acceptable to a user. These thresholds can be determined as described above.

Figure 4:
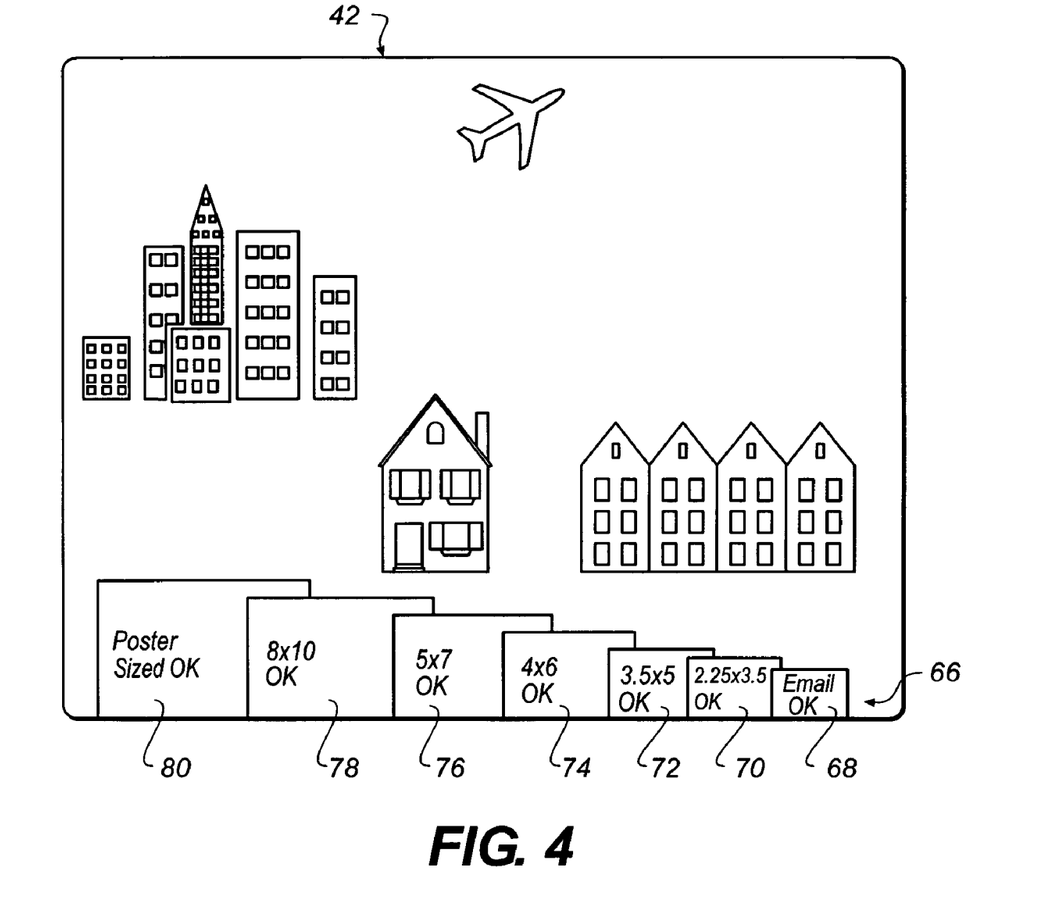
FIG. 4 shows another way of presenting a digital zoom indicator.
Figure 5:
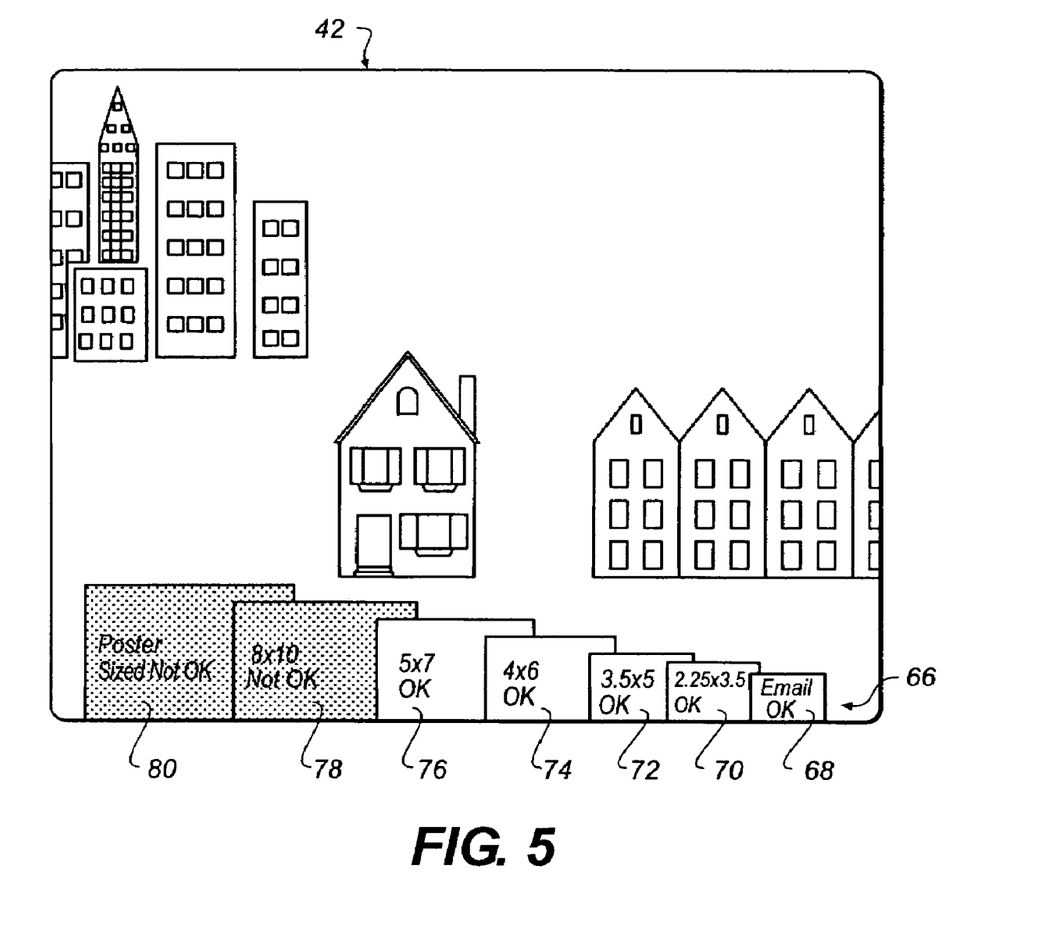
FIG. 5 shows another way of presenting a digital zoom indicator.

As is illustrated in FIG. 4, use icons 66 include an e-mail image icon 68, a 2.25"×3.5" icon 70, a 3.5"×5" icon 72, a 4"×6" icon 74, a 5"×7" icon 76, an 8"×10" icon 78 and a poster size icon 80. When a user has not yet engaged a digital zoom, all of the set of use icons 66 presented in a manner that indicates that a full range of output options are possible using with the current zoom settings. However, as is shown in FIG. 5, after digital zoom has been engaged and after it is determined that the digital zoom has reached a point where there is not sufficient resolution in an image captured at the current level of digital zoom to allow a captured image to be used to generate a poster size print or an 8"×10" print having an acceptable appearance, icons 80 and 78 change appearance. As shown in FIG. 5 this change in appearance can comprise a change in the color of icons 78 and 80, and/or a change in text in icons 78 and 80. Alternatively, icons 78 and 80 can be removed from the set of use icons 66 that are presented on information display 42 so that a user becomes aware that at the current level of digital zoom these uses are not recommended.

Further increases in digital zoom past the point illustrated in FIG. 5 can cause an image that is captured by camera 10 that have insufficient resolution to support other uses that require less image resolution such as rendering prints of the image at other, smaller, sizes. As is shown in FIG. 6, after digital zoom has been engaged and after it is determined that the digital zoom has reached a point where an image captured at the currently set digital zoom level does not have sufficient resolution for rendering prints in the 5"×7" or 4"×6" sizes that will have an acceptable appearance, icons 76 and 74 change appearance.

Figure 6:
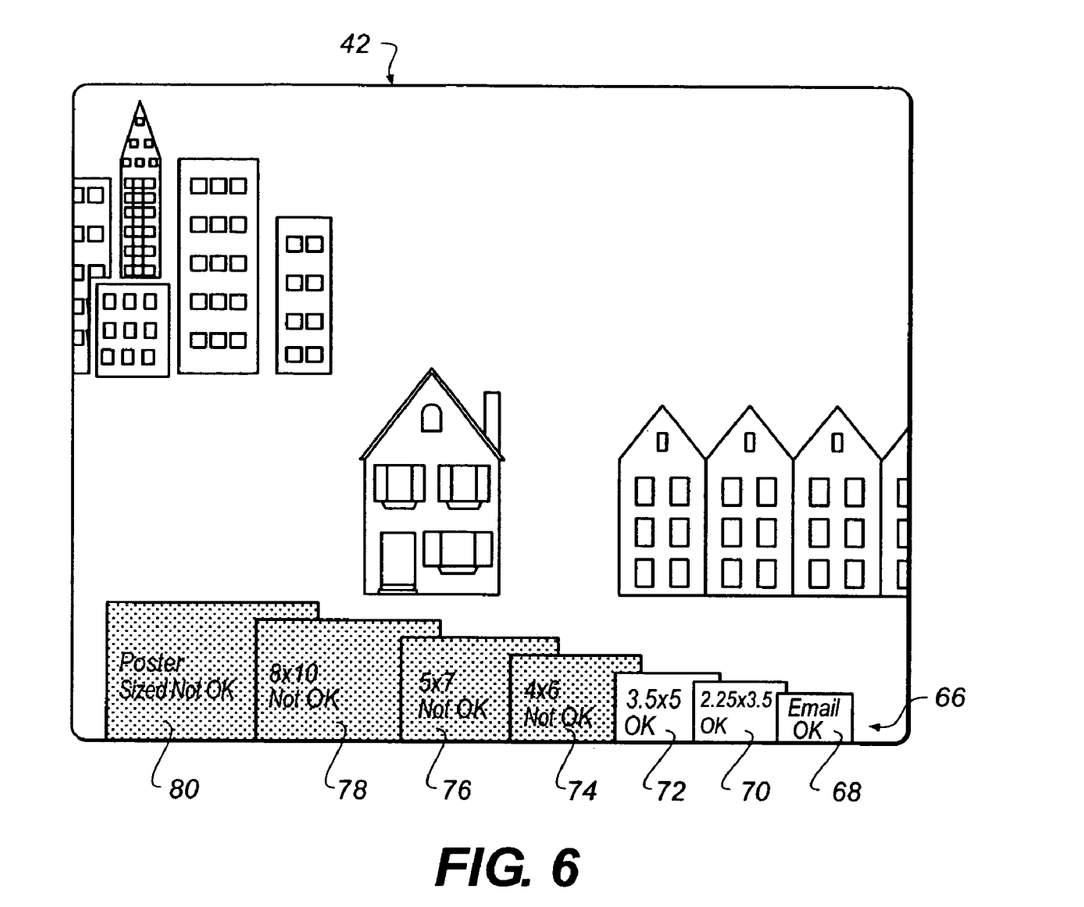
FIG. 6 shows another way of presenting a digital zoom indicator.
Figure 7:
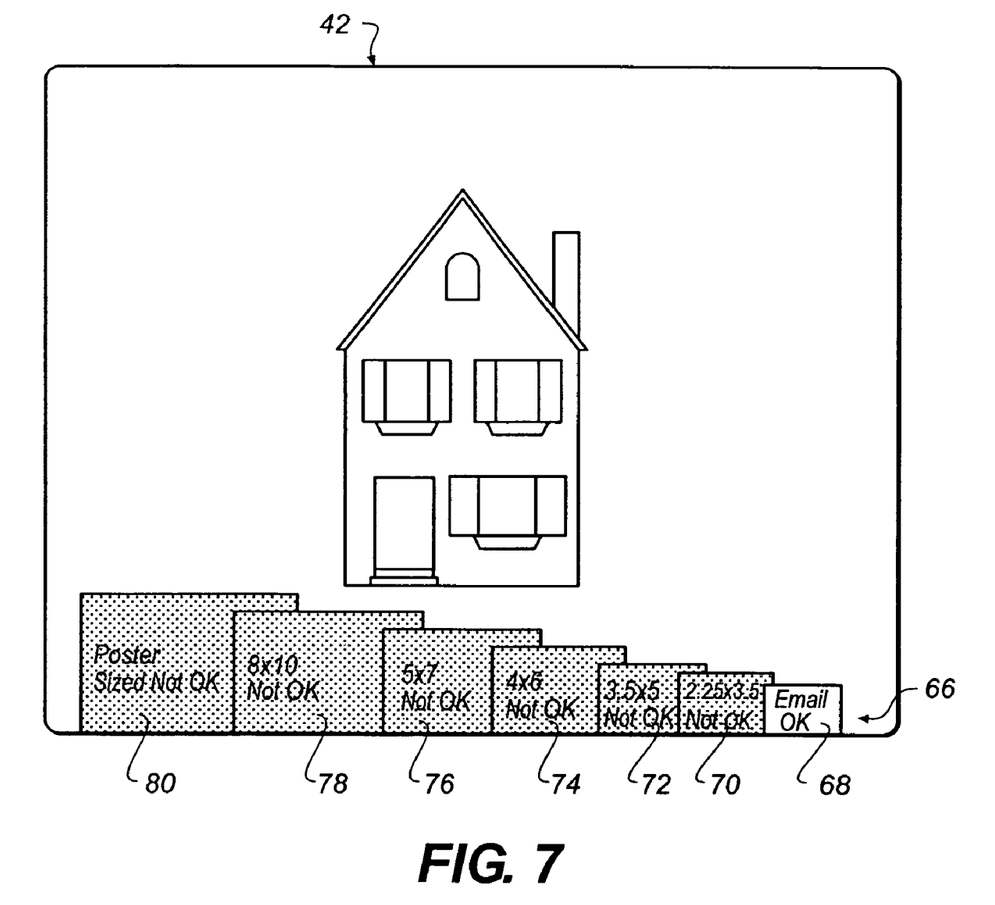
FIG. 7 shows another way of presenting a digital zoom indicator.

Still, further increases in digital zoom past the point illustrated in FIG. 6 can cause images captured by the digital camera 10 to have insufficient resolution to support other uses that require still less image resolution. As is shown in FIG. 7, after digital zoom has been further engaged and after it is determined that the digital zoom has reached a point where an image captured at the current levels of digital zoom will not have sufficient resolution to allow the image to be used for purposes such as rendering a 3"×5" or the 2.5"×3" print, icons 72 and 70 change appearance. At this point, further digital zoom can be suspended.

Accordingly, the user of digital camera 10 has an immediate indication as to how the extent of the digital zoom setting can influence whether a captured image will be useful for a variety of purposes. Importantly, this indication can be received before the user has made an election as to whether to proceed with image capture.

The image resolution capabilities of different output devices used to render images in the predetermined forms can influence whether a digital zoom setting used in capturing an image will cause an image to be captured that has a preferred appearance when the image is used for example to make a print. Generic standards that have applicability to a broad cross section of possible devices can be used for the purposes of the method. However, in an alternative embodiment of the present invention, controller 24 is adapted to receive information from user controls 54 or from a remote device with which controller 22 can communicate using communication circuit 26 and to use the received information to determine what kind of output capabilities are associated with an image rendering device to which an image is likely to be sent so that image output form icons 66 can be tailored to reflect such information and so that thresholds for transitioning the appearance of the use icons 66 can be determined.

In one example, a user 6 can establish a connection between camera 10 and a remote device such as a printer or a digital picture frame. The printer or digital picture frame can provide information from which controller 24 can automatically generate new members of the set of use icons 66.

The invention has been described in detail with particular reference to certain preferred embodiments thereof, but it will be understood that variations and modifications can be effected within the spirit and scope of the invention.

PARTS LIST

10. camera
12. digital imaging unit
14. digital image sensor
16. A/D converter
18. optical system
20. optical viewfinder
22. image processor
24. camera controller
30. image display driver
32. image display
34. digital zoom input
36. zoom selector switch
38. optical zoom driver
40. information display driver
42. information display
50. image memory
54. user controls
60. imager aperture driver
61. digital zoom indicator
62. imager shutter driver
63. scale
64. imager driver
65. movable bar
66. use icons
67. removable memory
68. icon
70. icon
72. icon
74. icon
76. icon
78. icon
80. icon 102, 104, 106 steps
108, 110, 112 steps
114, 116, 118 steps
120, 122 steps
130, 132, 134 steps
136, 138, 140 steps
142, 146, 148 steps
150, 152, 154 steps
156, 160, 162 steps
164, 166, 168 steps
170, 172, 174 steps

The invention claimed is:

1. A digital camera comprising
a digital imaging unit for generating a full sized digital image of a scene;
an evaluation image generation unit;
a digital zoom generating unit, including a user operated digital zoom selector, that determines a lesser portion of the full sized digital image to be rendered by interpolation into a final reproduced image that corresponds in size to images generated from the full sized image;
a graphical zoom indicator unit that generates a graphical indication in association with the evaluation image of increases and decreases of digital zoom ratios in response to user operation of the digital zoom selector; and
after digital zoom has started and during digital zoom, a controller that effects increasing and decreasing digital zoom ratios in response to user operation of the digital zoom selector and that interrupts indication of increasing digital zoom ratios for at least a first interval of time when the selected zoom ratio reaches a first digital zoom ratio setting that corresponds to a minimum acceptable image resolution where degradation of image quality level for a given size of rendered image is un-noticeable, the interruption serving as a warning to the user that said minimum acceptable image resolution for un-noticeable degradation in print image quality has been reached so as to allow the user the opportunity to discontinue further increase of the selected zoom ratio;
wherein said controller interrupts the indication increasing digital zoom for a second interval of time when the selected zoom ratio setting reaches a second digital zoom ratio setting, greater than said first digital zoom ratio setting, that corresponds to an unacceptable image quality level for said given size of rendered image.

2. The digital camera of claim 1, wherein said controller causes said graphical zoom ratio indicator to change its appearance as a visual warning to the user before indicating increasing of zoom ratio beyond said first digital zoom ratio setting.

3. The digital camera of claim 1, wherein said controller causes said graphical zoom ratio indicator to change its appearance as a visual warning to the user when the indicator reaches said first digital zoom ratio.

4. The digital camera of claim 1, wherein said indicator includes a fixed scale and a zoom indicator bar movable along said scale to indicate digital zoom ratio settings selected by the user, said bar having a first bar color at settings below said first digital zoom ratio; said controller responsive to user selection of increasing digital zoom ratio to move said bar toward said first digital zoom ratio and to change the bar to a second bar color when said bar is at said first digital zoom ratio setting.

5. The digital camera of claim 4, wherein said scale has a second range representing digital zoom settings greater than said first range; and said controller, in response to continued user selection of increasing digital zoom ratios, changes said bar to a second bar color before moving said bar into said second range.

6. The digital camera of claim 4, wherein said second bar color is red.

7. The digital camera of claim 5, wherein said second bar color is red.

8. The digital camera of claim 1, wherein when the user continues to select increasing further zoom ratio settings beyond said second, the indicator, after said second interval of time, resumes indicating increasing zoom ratio settings beyond said second digital zoom ratio setting.

9. The digital camera of claim 8, wherein said controller causes said graphical zoom ratio indicator to further change its appearance as a visual warning to the user before indicating increasing of zoom ratio beyond said second digital zoom ratio setting.

10. The digital camera of claim 7, wherein said indicator includes a fixed scale having a first scale color and an indicator bar having a first bar color, said bar having first color when in a zoom ratio range below said first digital zoom ratio setting; said controller being responsive to user selection of increasing digital zoom ratio to move said bar toward said first digital zoom ratio and to change the bar to a second bar color when said bar is at and above said first digital zoom ratio setting and being responsive to user selection of increasing digital zoom ratio to further move the bar toward said second digital zoom ratio and to change the scale to a second scale color when said bar is at and above said second digital zoom ratio.

11. The digital camera of claim 10, wherein said second bar color and said second scale color are red.

12. The digital camera of claim 1, wherein said user-operated digital zoom selector is a switch and said controller resumes increasing of zoom ratio only after said switch is opened and re-closed by the user to obtain increased digital zoom settings.

13. The digital camera of claim 1, wherein said controller is responsive to user selection of decrease in zoom ratio to continuously decrease zoom ratio without interruption whenever said first digital zoom ratio level is encountered.

14. The digital camera of claim 13, wherein said graphical zoom indicator includes a scale and a zoom indicator bar movable along said scale to indicate zoom ratio settings and said controller causes said movable bar to change color from a second color to first color when said bar moves in a zoom decreasing direction through said first digital zoom level.

15. The digital camera of claim 7, wherein said controller is responsive to user selection of decrease in zoom ratio to continuously decrease zoom ratio without interruption whenever said second digital zoom ratio level is encountered.

16. The digital camera of claim 15, wherein said graphical zoom indicator includes a scale and a zoom indicator bar movable along said scale to indicate zoom ratio settings and said controller causes said scale to change color from a second color to first color when said bar moves in a zoom decreasing direction through said second digital zoom level.

17. The digital camera of claim 7, wherein said user-operated digital zoom selector is a switch and said controller resumes increasing of zoom ratio only after said switch is opened and re-closed by the user to obtain increased digital zoom settings.

* * * * *

UNITED STATES PATENT AND TRADEMARK OFFICE
CERTIFICATE OF CORRECTION

PATENT NO.         : 7,573,514 B2
APPLICATION NO.    : 11/050531
DATED              : August 11, 2009
INVENTOR(S)        : Stephen J. Pasquarette et al.

It is certified that error appears in the above-identified patent and that said Letters Patent is hereby corrected as shown below:

| Column | Line | |
|--------|------|---|
| 11 | 12 | In Claim 1, after "comprising" insert --:--. |
| 11 | 38 | In Claim 1, delete "selected" and insert --select digital--, therefor. |
| 11 | 39 | In Claim 1, delete "indication increasing" and insert --indication of increasing--, therefor. |

Signed and Sealed this
Third Day of May, 2011

David J. Kappos
*Director of the United States Patent and Trademark Office*